United States Patent
Frese

(10) Patent No.: US 9,625,280 B2
(45) Date of Patent: Apr. 18, 2017

(54) SENSOR DEVICE, STEERING ANGLE SENSOR DEVICE, AND METHOD FOR DETERMINING THE POSITION OF A METAL OBJECT

(71) Applicant: Robert Bosch GmbH, Stuttgart (DE)

(72) Inventor: Volker Frese, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 3 days.

(21) Appl. No.: 14/783,315

(22) PCT Filed: Apr. 2, 2014

(86) PCT No.: PCT/EP2014/056586
§ 371 (c)(1),
(2) Date: Oct. 8, 2015

(87) PCT Pub. No.: WO2014/166792
PCT Pub. Date: Oct. 16, 2014

(65) Prior Publication Data
US 2016/0069711 A1    Mar. 10, 2016

(30) Foreign Application Priority Data

Apr. 11, 2013  (DE) .................. 10 2013 206 426

(51) Int. Cl.
*G01D 5/20* (2006.01)
*B62D 15/02* (2006.01)
*G01B 7/00* (2006.01)

(52) U.S. Cl.
CPC ....... *G01D 5/2006* (2013.01); *B62D 15/0215* (2013.01); *G01B 7/003* (2013.01); *G01D 5/202* (2013.01)

(58) Field of Classification Search
CPC .. B62D 15/0215; G01B 7/003; G01D 5/2006; G01D 5/202

(Continued)

(56) References Cited

U.S. PATENT DOCUMENTS

| 4,451,780 A | 5/1984 | Ogasawara |
| 6,984,975 B2 * | 1/2006 | Aruga ................. G01D 5/204 |
| | | 324/207.17 |

(Continued)

FOREIGN PATENT DOCUMENTS

| DE | 26 40 057 A1 | 3/1977 |
| DE | 34 25 354 A1 | 1/1986 |

(Continued)

OTHER PUBLICATIONS

International Search Report corresponding to PCT Application No. PCT/EP2014/056586, mailed Jul. 3, 2014 (German and English language document) (7 pages).

*Primary Examiner* — Jay Patidar
(74) *Attorney, Agent, or Firm* — Maginot, Moore & Beck LLP

(57) ABSTRACT

A sensor device for determining the position of a metal body comprising at least one Eddy current sensor, which has a coil for generating a high-frequency electromagnetic alternating field and a device for operating the coil and for detecting an impedance of the coil, and comprising an analyzing device, which determines the position of the metal body relative to the coil using the detected impedance. A reference Eddy current sensor is provided which has a reference coil for generating a high-frequency electromagnetic alternating field and a reference device for operating the reference coil and for detecting an impedance of the reference coil and which is oriented/designed such that the electromagnetic alternating field of the reference Eddy current sensor is free of metal bodies, wherein the analyzing device is designed to form a beat from the detected impedance and to determine the position of the metal body dependent on the beat.

7 Claims, 1 Drawing Sheet

(58) Field of Classification Search
USPC .............................................. 324/207.16, 228
See application file for complete search history.

(56) References Cited

U.S. PATENT DOCUMENTS

| 7,106,052 | B2* | 9/2006 | Ehls | ..................... H03K 17/952 |
| | | | | 324/207.12 |
| 2003/0038628 | A1 | 2/2003 | Nath et al. | |

FOREIGN PATENT DOCUMENTS

| FR | 2 783 910 A1 | 3/2000 |
| WO | 02/48654 A1 | 6/2002 |

* cited by examiner

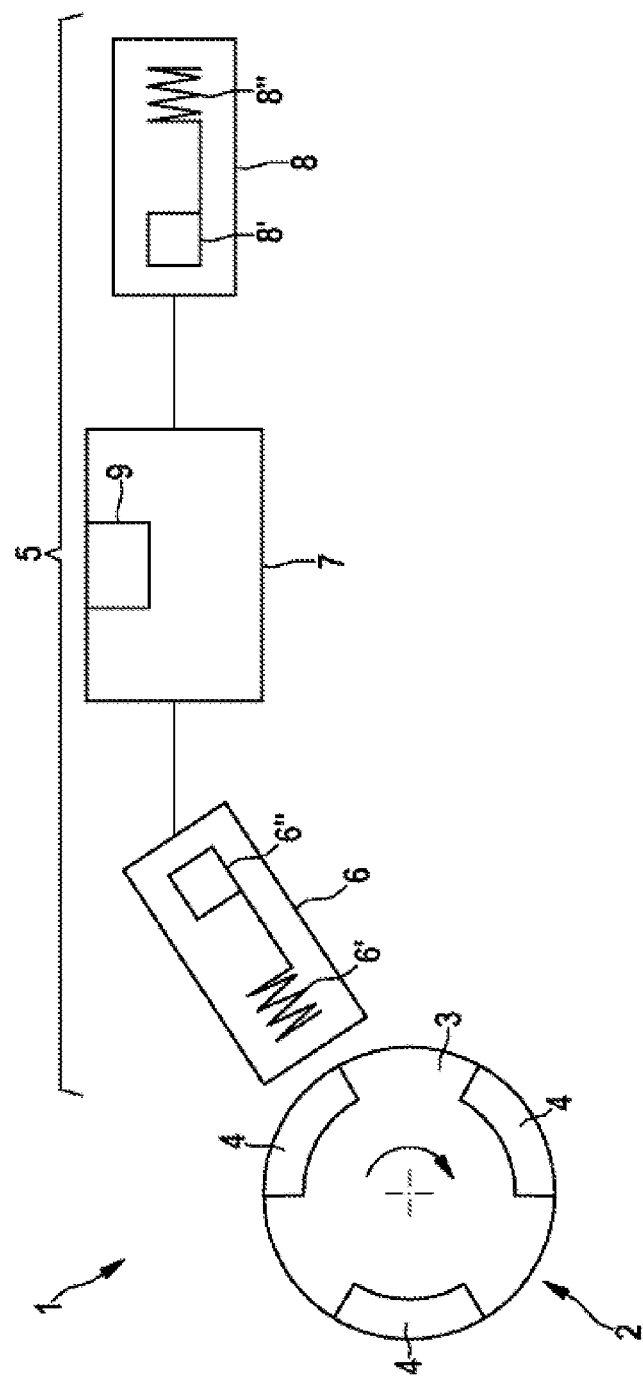

SENSOR DEVICE, STEERING ANGLE SENSOR DEVICE, AND METHOD FOR DETERMINING THE POSITION OF A METAL OBJECT

This application is a 35 U.S.C. §371 National Stage Application of PCT/EP2014/056586, filed on Apr. 2, 2014, which claims the benefit of priority to Serial No. DE 10 2013 206 426.8, filed on Apr. 11, 2013 in Germany, the disclosures of which are incorporated herein by reference in their entirety.

The disclosure relates to a sensor device for determining the position of a metal body, in particular an actuating member of a steering device of a motor vehicle, having at least one eddy-current sensor which has at least one excitation coil for generating a high-frequency alternating electromagnetic field and at least one device for operating the coil and for detecting an impedance, in particular a change in impedance, of the coil, and having an evaluation device which determines the position of the metal body relative to the coil on the basis of the detected impedance.

The disclosure also relates to a steering-angle sensor device for detecting the steering angle of a motor vehicle, having an actuating member, in particular steering shaft, which determines the steering angle and on which at least one metal body, in particular a plurality of metal bodies, is/are arranged, in particular in an evenly distributed manner, and having a sensor device for detecting the position of the at least one metal body.

Furthermore, the disclosure relates to a method for determining the position of a metal body, in particular an actuating member of a steering device of the motor vehicle, by means of at least one eddy-current sensor which has at least one coil to which a high-frequency alternating current is fed in order to generate a high-frequency alternating electromagnetic field, and by means of a device with which an impedance, in particular a change in impedance, of the coil is detected, wherein the position of the metal body relative to the coil is determined on the basis of the detected impedance.

BACKGROUND

Sensor devices and methods for determining the position of metal bodies are known from the prior art. Eddy-current sensors have a coil to which a high-frequency alternating current is fed, as a result of which an alternating electromagnetic field is formed around the coil. The field lines of the high-frequency alternating field emerge in this case from the sensor plane. If an electrically conductive object, in particular a metal body, approaches the eddy-current sensor, the alternating field induces eddy currents in the metal body. Said eddy currents themselves form their own electromagnetic field which counteracts the coil field as a result of which the impedance or inductance of the coil changes. In this case, the impedance of the coil changes in proportion with the distance of the metal body from the coil, with the result that the distance or a change in distance of the metal body from the coil can be determined on the basis of the impedance or change in impedance. In order to feed or operate the coil with high-frequency alternating current and in order to detect an impedance or change in impedance of the coil, the eddy-current sensor generally has a corresponding device which may be formed from one or more electrical/electronic components.

These days, it is sought to configure corresponding eddy-current sensors or sensor devices to be as small as possible in order to save installation space, in particular in the motor vehicle. As a result of this, correspondingly small conductor-track geometries are necessary for such eddy-current sensors. However, these have a low inductance. The resonant circuits resulting from this must therefore be operated with high frequencies of up to 100 MHz. In order to be able to evaluate this frequency with frequency counters, the evaluation device must likewise operate at a correspondingly high frequency. Evaluation devices or calculation units which are conventionally used in the automotive industry are not able to directly work with such high frequencies. For this purpose, so-called high-end evaluation devices are necessary, which disagreeably affect manufacturing costs, however.

SUMMARY

The sensor device according to the disclosure has the advantage that, despite a low inductance of the coil and the hence accompanying high frequency, simple calculating units or microcontrollers can be used to evaluate the impedance data in order to determine the position of the metal body. According to the disclosure, provision is made in this connection for the sensor device to have a reference eddy-current sensor which has at least one reference coil and at least one reference device for detecting an impedance of the coil, and which is designed and/or set up such that an alternating electromagnetic field has no metal bodies therein, wherein the evaluation device is designed to form a beat from the impedances detected by the devices, which impedances are output as signals with corresponding frequencies, and to determine the position of the metal body on the basis of the beat. Provision is also made that, in addition to the eddy-current sensor, a reference eddy-current sensor is provided and set up or arranged such that the high-frequency alternating field thereof does not reach the region of the metal body. The device of the reference eddy-current sensor thus determines a reference impedance corresponding to the high-frequency feed-in of the coil. The evaluation device forms the so-called beat from the frequencies which are detected by the measuring device of the reference eddy-current sensor and the eddy-current sensor. Here, the resultant is to be understood to be an additive superposition of the signals of the measured value devices which differ in their frequency on the basis of the proximity of the metal body to the eddy-current sensor. In comparison to the detected frequencies, the beat has a very much lower frequency which can also be evaluated using simple calculating units, as are often used in the automotive sector. As a result, the evaluation, even of high-frequency signals of the measuring devices, is possible in a simple manner.

Provision is particularly preferably made for the evaluation device to have a flip-flop component. The detected frequencies or signals of the measuring devices can be simply and inexpensively added to the beat using the flip-flop component.

Provision is also preferably made for the sensor device to have two oscillator devices of which one is connected to a clock input of the flip-flop component and the other is connected to a master input of the flip-flop component. The oscillator devices are used firstly once to generate the high-frequency current feed into the respective coil. Owing to the advantageous connection to the flip-flop component, the beat is preferably generated at a slave output of the flip-flop component.

According to a preferred development of the disclosure, provision is made for the device and the reference device to each have a resonant circuit with an inverter. By actuating the inverter, an oscillation or resonant frequency can be generated in the respective resonant circuit in a simple manner. In particular, as a result of this, the above-mentioned oscillator devices can be represented in an inexpensive manner.

The steering-angle sensor device according to the disclosure is distinguished by the above-described sensor device. The advantages already mentioned above result from this. The metal body or bodies to be detected are in this case expediently arranged so as to be evenly distributed, for example, over the circumference of a steering shaft/rod, with the result that a rotation and/or angular position of the steering shaft is detectable by means of the sensor device.

The method according to the disclosure having is distinguished in that a reference eddy-current sensor having a reference coil and a reference device is provided, wherein a high-frequency alternating current is fed to the coil, like the coil of the eddy-current sensor, and an impedance of the coil of the reference eddy-current sensor is detected by means of a measuring device of the reference eddy-current sensor, and wherein a beat is formed from the detected impedance (signals), on the basis of which beat the position of the metal body is determined. The advantages already mentioned above result from this.

BRIEF DESCRIPTION OF THE DRAWING

The disclosure will be explained in more detail below with reference to the drawing in which the single FIGURE shows a schematic illustration of an exemplary embodiment of an advantageous steering-angle sensor device.

DETAILED DESCRIPTION

The FIGURE shows a schematic illustration of a steering-angle sensor device 1 of a motor vehicle which is used to detect the present steering angle of the motor vehicle. In this case, the motor vehicle has an actuating member 2 which, in the present exemplary embodiment, is designed as steering shaft 3. Three metal bodies 4 are arranged on the steering rod 3. The metal bodies 4 are in this case arranged in a manner evenly distributed over the circumference of the steering shaft. In order to determine the angular position and/or a change in angular position of the steering shaft 3, a sensor device 5 is provided.

The sensor device 5 has an eddy-current sensor 6, an evaluation device 7 and a reference eddy-current sensor 8. The two eddy-current sensors 6 and 8 each have a coil 6' or reference coil 8' and a device 6" or reference device 8".

The evaluation device 7 actuates the eddy-current sensors 6 and 8 such that a high-frequency alternating current is fed to the respective coil 6' or 8' by the device 6" or 8", as a result of which the respective coil 6', 8' generates a high-frequency alternating electromagnetic field. For this purpose, the devices 6" and 8" each have a resonant circuit with an inverter and, in particular, a capacitor. A desired oscillation for generating the high-frequency alternating electromagnetic field in a simple and known manner in the form of a resonant frequency can be generated in the resonant circuit by means of the inverter. In this case, the inverter is actuated such that the resonant circuit oscillates with its inductance at the resonant frequency. Owing to a rotation of the steering shaft 3, one of the metal bodies 4 travels into the region of the alternating field of the eddy-current sensor 6 or out of the region of the alternating field. The alternating electromagnetic field induces eddy currents in the metal body 4, which in turn generate their own electromagnetic field which acts in turn on the coil 6'. In particular, the alternating field generated by the eddy currents leads to a change in impedance of the coil 6', which is detected by the corresponding device 6" having means necessary for detecting impedance. The same correspondingly applies to the reference eddy-current sensor 8. However, said reference eddy-current sensor is set up such that a high-frequency alternating field generated thereby does not reach the region of the metal body 4 and oscillates freely. However, in this case, too, the impedance of the coil 8' is detected by means of the device 8".

The devices 6" and 8" generate an impedance signal which is conducted to the evaluation device 7. Said evaluation device has a flip-flop component 9, to which the impedance signals are supplied. The impedance signals are additively superposed by means of the flip-flop component 9, as a result of which a so-called beat is generated. In comparison to the impedance signals, the beat has a much lower frequency. Therefore, lower requirements in terms of operating frequency are placed on the evaluation device 7 or on a microprocessor of the evaluation device 7, as a result of which costs and manufacturing complexity for the sensor device 5 can be kept low.

The flip-flop component 9 is expediently designed as master-slave flip-flop and has a clock input to which the frequency of a first resonant circuit of the device 6" is supplied, wherein the frequency of the resonant circuit of the reference device 8" is supplied to a master input of the flip-flop 9. The signal of the beat is then present at a slave output of the flip-flop component 9 and can be used by the evaluation device 7 to determine the position of the metal body 4, which is located in the alternating electromagnetic field of the eddy-current sensor 6, and hence the angular position of the steering shaft 3.

The invention claimed is:

1. A sensor device for determining a position of a metal body, the sensor device comprising:
at least one eddy-current sensor having (i) a coil configured to generate a first high-frequency alternating electromagnetic field and (ii) a device configured to operate the coil and detect an impedance of the coil;
a reference eddy-current sensor having (i) a reference coil configured to generate a second high-frequency alternating electromagnetic field and (ii) a reference device configured to operate the reference coil and detect an impedance of the reference coil, the reference coil being arranged such that no metal bodies are present in the second high-frequency alternating electromagnetic field; and
an evaluation device configured to (i) form a beat based on the impedance of the coil and the impedance of the reference coil and (ii) determine the position of the metal body relative to the coil based on the beat.

2. The sensor device as claimed in claim 1, wherein the evaluation device has a flip-flop component.

3. The sensor device as claimed in claim 1, wherein the at least one eddy-current sensor and the reference eddy-current sensor each have a resonant circuit with an inverter.

4. The sensor device as claimed in claim 1, wherein the metal body is an actuating member of a steering device of a motor vehicle.

5. A steering-angle sensor device for determining a steering angle of a steering device of a motor vehicle, the steering-angle sensor device comprising:
a steering shaft on which at least one metal body is arranged; and a sensor device for detecting the position of the at least one metal body, the sensor device comprising:
- at least one eddy-current sensor having (i) a coil configured to generate a first high-frequency alternating electromagnetic field and (ii) a device configured to operate the coil and detect an impedance of the coil;
- a reference eddy-current sensor having (i) a reference coil configured to generate a second high-frequency alternating electromagnetic field and (ii) a reference device configured to operate the reference coil and detect an impedance of the reference coil, the reference coil being arranged such that no metal bodies are present in the second high-frequency alternating electromagnetic field; and
- an evaluation device configured to (i) form a beat based on the impedance of the coil and the impedance of the reference coil and (ii) determine the position of the metal body relative to the coil based on the beat.

6. A method for determining a position of a metal body, the method comprising:
- feeding a first high-frequency alternating current to at least one coil of at least one eddy-current sensor, the at least one coil being configured to generate a first high-frequency alternating electromagnetic field;
- detecting an impedance of the at least one coil using a device of the at least one eddy-current sensor, the device being configured to operate the at least one coil;
- feeding a second high-frequency alternating current to a reference coil of a reference eddy-current sensor, the reference coil being configured to generate a second high-frequency alternating electromagnetic field and being arranged such that no metal bodies are present in the second high-frequency alternating electromagnetic field;
- detecting an impedance of the reference coil using a reference device of the reference eddy-current sensor, the reference device being configured to operate the reference coil;
- forming a beat based on the impedance of the coil and the impedance of the reference coil; and
- determining the position of the metal body based on the beat.

7. The method as claimed in claim 6, wherein the metal body is an actuating member of a steering device of a motor vehicle.

\* \* \* \* \*